United States Patent [19]
Okano et al.

[11] Patent Number: 5,208,484
[45] Date of Patent: May 4, 1993

[54] CONTROL SYSTEM FOR VEHICLE SAFETY DEVICE

[75] Inventors: Masami Okano; Kunihiro Takeuchi; Hideyuki Kaneko, all of Higashimatsuyama, Japan

[73] Assignee: Zexel Corporation, Tokyo, Japan

[21] Appl. No.: 659,563

[22] Filed: Feb. 22, 1991

[30] Foreign Application Priority Data

Mar. 1, 1990 [JP] Japan .................................. 2-47289

[51] Int. Cl.$^5$ .......................................... B60R 21/32
[52] U.S. Cl. .................................. 307/10.1; 180/274; 280/735; 340/436
[58] Field of Search ................. 307/9.1, 10.1; 280/734, 280/735; 190/271, 274; 340/425.5, 43 C

[56] References Cited

U.S. PATENT DOCUMENTS

| | | | |
|---|---|---|---|
| 3,960,691 | 6/1976 | Zoltan et al. | 204/408 |
| 4,164,263 | 8/1979 | Heintz et al. | 280/735 |
| 4,366,465 | 12/1982 | Veneziano | 307/10.1 |
| 4,836,024 | 6/1989 | Woehrl et al. | 307/10.1 |
| 4,984,463 | 1/1991 | Idogaki et al. | 73/516 R |
| 5,018,763 | 5/1991 | Okano et al. | 307/10.1 |
| 5,037,129 | 8/1991 | Fritz et al. | 280/734 |
| 5,083,276 | 1/1992 | Okano et al. | 307/10.1 |

FOREIGN PATENT DOCUMENTS

| | | |
|---|---|---|
| 2655604 | 6/1978 | Fed. Rep. of Germany . |
| 3932457 | 3/1990 | Fed. Rep. of Germany . |
| 49-55031 | 5/1974 | Japan . |
| 55-30693 | 3/1980 | Japan . |
| 2-5371 | 1/1990 | Japan . |

*Primary Examiner*—Jeffrey A. Gaffin

[57] ABSTRACT

A control system for a vehicle safety device includes a pair of acceleration sensing circuits. The outputs of the acceleration sensing circuits correspond to a deceleration of the vehicle in a direction of running of a vehicle, and are in opposite phase with each other. A differential calculation device effects calculation in accordance with the difference between the outputs of the acceleration sensing circuits, so as to cause noises, applied to the acceleration sensing circuits, to cancel each other, thereby preventing an inadvertent activation of the vehicle safety device due to such noises. According to another alternative construction, in order to prevent the inadvertent activation of the vehicle safety device due to the noises, the opposite-phase outputs of the pair of acceleration sensing circuits are integrated by a pair of integrating circuits, and a pair of collision judgment circuits compare the outputs of the integrating circuits with respective threshold levels so as to judge whether a collision has occurred.

8 Claims, 6 Drawing Sheets

CONTROL SYSTEM FOR VEHICLE SAFETY DEVICE

BACKGROUND OF THE INVENTION

This invention relates to a control system for a vehicle safety device such as an air bag.

As disclosed in Japanese Laid-Open (Kokai) Patent Application No. 55031/74 and Japanese Laid-Open Utility Model Application No. 5371/90, there is known a system for controlling a vehicle safety device such as an air bag. This control system comprises an acceleration sensing circuit for outputting voltage corresponding to the acceleration of the vehicle, an amplifier circuit for amplifying the output from the acceleration sensing circuit, integrating means for integrating the output from the amplifier circuit, collision judgment means for comparing the integral value from the integrating means with a threshold level so as to judge whether or not a vehicle collision has occurred, and a drive circuit responsive to a collision judgment signal from the collision judgment means so as to supply electric current to thereby expand the air bag.

In the above control system, for example, when a large noise is applied to the acceleration sensing circuit, the integral value temporarily increases and may go beyond the threshold level. In such a case, despite the fact that any collision has not occurred, it is possible that the collision judgment means may decide the collision with the result that the air bag is inadvertently activated.

U.S. Pat. No. 4,836,024 constituting the prior art of the present invention discloses a control system provided with two acceleration sensors. The outputs of the two acceleration sensors are in phase with each other with respect to the acceleration and deceleration in the direction of running of the vehicle.

Two of the inventors of the present invention, together with another inventor, filed Jan. 18, 1991 a U.S. Pat. Application Ser. No. 642,951, and also filed Feb. 6, 1991 a U.S. Patent Application, both of which are directed to an air bag control system. These control systems are provided with two acceleration sensing circuits whose outputs are in phase with each other with respect to the acceleration and deceleration in the direction of running of the vehicle. Based on the output level of each of the acceleration sensing circuits, a microcomputer detects its malfunction.

An acceleration sensor disclosed in Japanese Laid-Open Patent Application No. 30693/80 is similar in construction to an acceleration sensor used in one embodiment of the present invention.

SUMMARY OF THE INVENTION

It is an object of this invention to provide a control system which can prevent an inadvertent activation of a vehicle safety device even when a noise is applied to an acceleration sensing circuit.

According to one aspect of the present invention, there is provided a control system for a vehicle safety device comprising:

(a) first and second acceleration sensing circuits each having an acceleration sensor, outputs of the acceleration sensing circuits corresponding to a deceleration of a vehicle in a direction of running of the vehicle, and being in opposite phase with each other;

(b) differential calculation means for effecting calculation in accordance with the outputs of the pair of acceleration sensing circuits;

(c) collision judgment means for judging, in accordance with a differential calculation value calculated by the differential calculating means, whether or not a collision of the vehicle has occurred; and (d) a drive circuit responsive to the collision judgment made by the collision judgment means so as to activate the vehicle safety device.

According to another aspect of the invention, there is provided a control system for a vehicle safety device comprising:

(a) a pair of acceleration sensing circuits each having an acceleration sensor, outputs of the acceleration sensing circuits corresponding to a deceleration of a vehicle in a direction of running of the vehicle, and being in opposite phase with each other;

(b) a pair of integrating means for integrating the outputs of the pair of acceleration sensing circuits, integral values of the pair of integrating means being in opposite phase with each other;

(c) a pair of collision judgment means for respectively comparing the integral values, obtained by the pair of integrating means, with threshold levels so as to judge whether or not a collision of the vehicle has occurred; and (d) a drive circuit for activating the vehicle safety device when the pair of collision judgment means both judges that the collision has occurred.

DESCRIPTION OF THE PREFERRED EMBODIMENTS OF THE INVENTION

Figure 1:
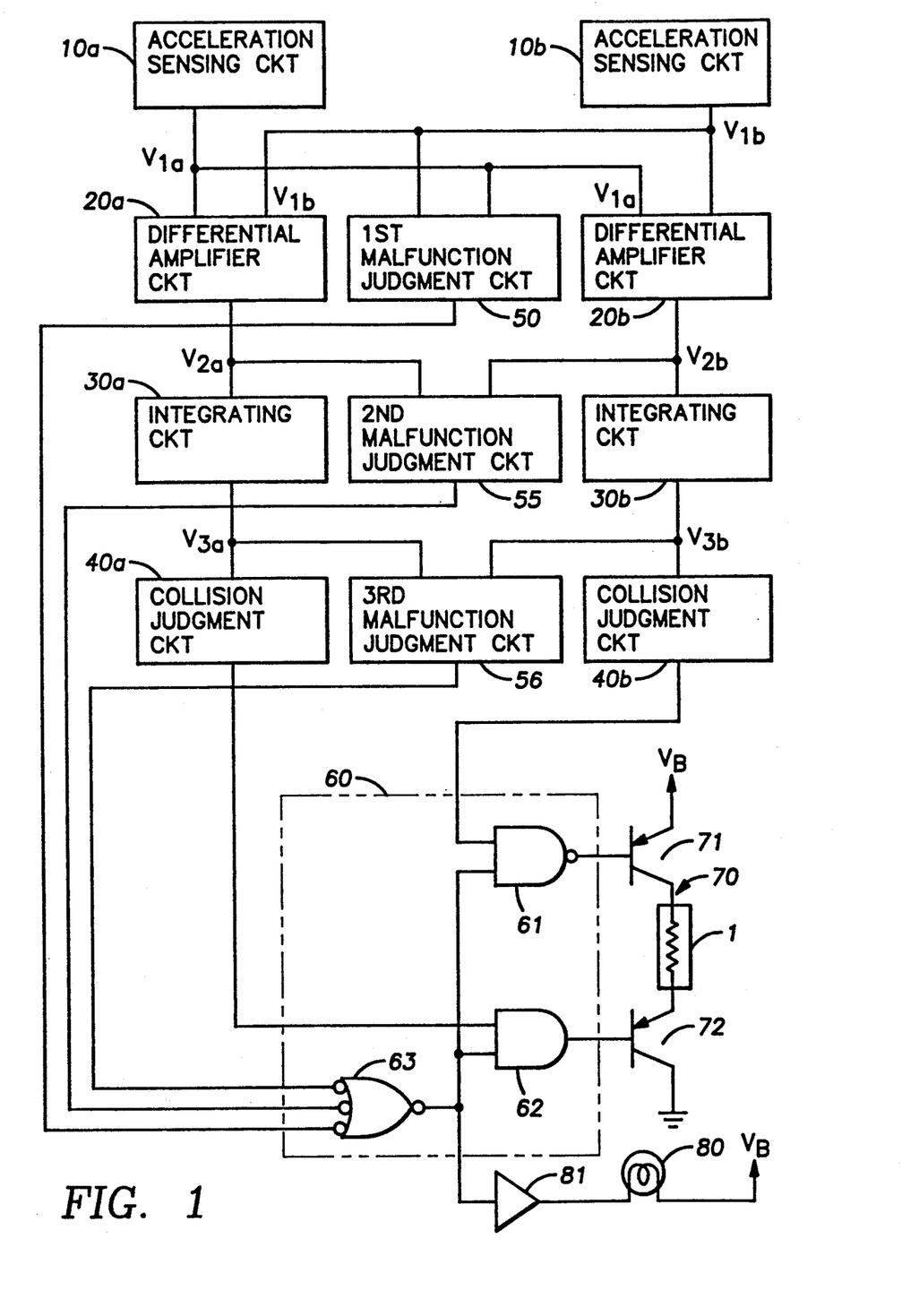
FIG. 1 is a circuit block diagram schematically showing a control system according to the present invention.

One preferred embodiment of the invention will now be described with reference to FIGS. 1 to 6. FIG. 1 shows a general construction of a control system for controlling a squib 1 of an air bag (vehicle safety device). The control system comprises a pair of acceleration sensing circuits 10a and 10b, a pair of differential amplifier circuits 20a and 20b, a pair of integrating circuits 30a and 30b, a pair of collision judgment circuits 40a and 40b, first, second and third malfunction judgment circuits 50, 55 and 56, an activation inhibition circuit 60, and a drive circuit 70.

Referring briefly to the operation, the outputs of the pair of acceleration sensing circuits 10a and 10b correspond to the acceleration of the vehicle, and are in opposite phase with each other. The pair of differential amplifier circuits 20a and 20b amplify the outputs of the pair of acceleration sensing circuits 10a and 10b in a differential manner, and the outputs of the two differential amplifier circuits 20a and 20b are in opposite phase with each other. The pair of integrating circuits 30a and 30b integrate the output of the pair of differential amplifier circuits 20a and 20b, respectively. The integral outputs of the two integrating circuits 30a and 30b are in opposite phase with each other. The pair of collision judgment circuits 40a and 40b are responsive respectively to the integral outputs from the pair of integrating circuits 40a and 40b so as to judge whether or not a collision has occurred.

The first malfunction judgment circuit 50 is responsive to the outputs of the acceleration sensing circuits 10a and 10b so as to judge whether or not the acceleration sensing circuits 10a and 10b are subjected to a malfunction. Similarly, the second malfunction judgment circuit 55 is responsive to the outputs of the differential amplifier circuits 20a and 20b so as to judge whether or not the acceleration sensing circuits 10a and 10b, as well as the differential amplifier circuits 20a and 20b, are subjected to a malfunction. The third malfunction judgment circuit 56 is responsive to the outputs of the integrating circuits 30a and 30b so as to judge whether or not the acceleration sensing circuits 10a and 10b, the differential amplifier circuits 20a and 20b, and the integrating circuits 30a and 30b are subjected to a malfunction.

Basically, the drive circuit 70, when receiving the collision judgment signals from both the pair of the collision judgment circuits 40a and 40b, effects the ignition of the squib 1. However, when the malfunction judgment signal is outputted any one of the three malfunction judgment circuits 50, 55 and 56, the activation inhibition circuit 60 is responsive to this malfunction judgment signal to inhibit the ignition of the squib 1.

Figure 2:
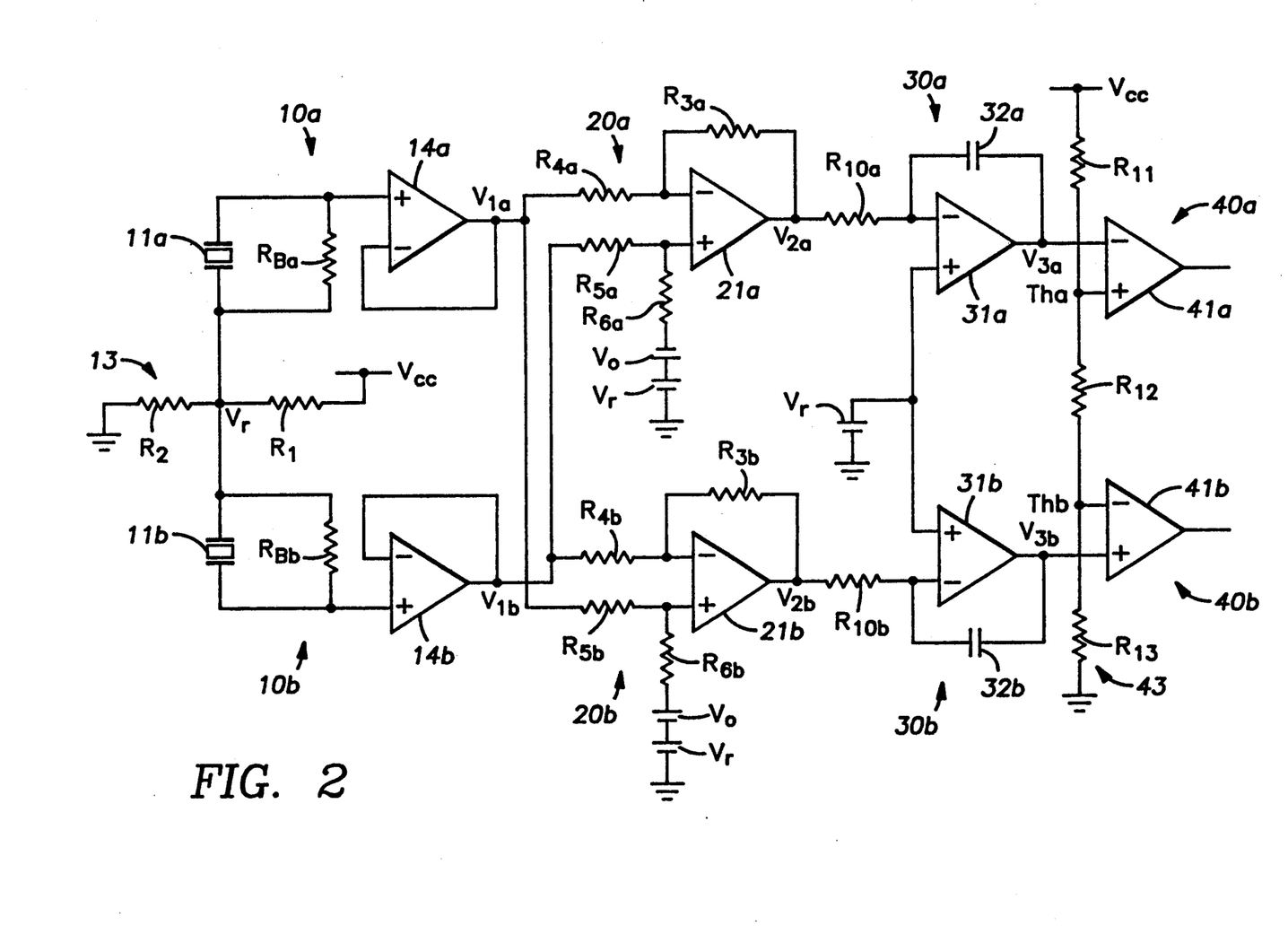
FIG. 2 is a circuit diagram of acceleration sensing circuits, differential amplifier circuits, integrating circuits and collision judgment circuits of the control system of FIG. 1.

Each of the constituent parts of the control system will now be described. As shown in FIG. 2, the acceleration sensing circuits 10a and 10b comprise respective piezoelectric elements (acceleration sensors) 11a and 11b, and a common reference voltage generating circuit 13. The reference voltage generating circuit 13 is composed of serially-connected resistors R1 and R2, and is connected at one terminal to a constant voltage source Vcc and connected at the other terminal to the ground. The voltage, obtained by dividing the constant voltage Vcc by the resistors R1 and R2, is applied as a reference voltage VR to one terminals of the piezoelectric elements 11a and 11b. In this embodiment, there is established VR=Vcc/2. The other terminals of the piezoelectric elements 11a and 11b are connected to buffers 14a and 14b, respectively. A bias resistor RBa is connected between the opposite terminals of the piezoelectric element 11a, and a bias resistor RBb is connected between the opposite terminals of the piezoelectric element 11b. Voltage V1a and V1b each of which is the sum of the reference voltage Vr and a signal component corresponding to the acceleration/deceleration, are produced at the other terminals of the piezoelectric elements 11a and 11b, respectively.

Figure 3:
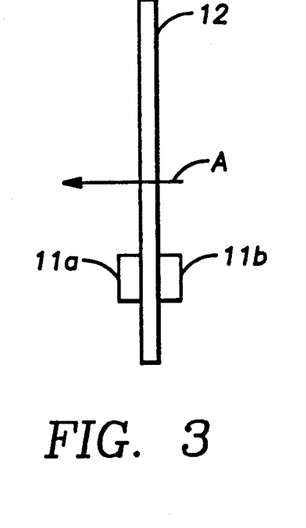
FIG. 3 is a side-elevational view showing the condition of mounting of piezoelectric elements incorporated in the acceleration sensing circuit of FIG. 2.

As shown in FIG. 3, the piezoelectric elements 11a and 11b are mounted on front and rear surfaces of a common base plate (base member) 12, respectively. The base plate 12 is made of a rigid material, and is mounted on a suitable portion of the vehicle, the base plate 12 extending in a direction perpendicular to the longitudinal direction of the vehicle, that is, the direction A of running of the vehicle. The piezoelectric elements 11a and 11b are equal to each other in characteristics, and are subjected to an equal inertia force when the vehicle is accelerated or decelerated. Therefore, the piezoelectric elements 11a and 11b output signal components of the same magnitude which are in synchronism with each other. Particularly, in this embodiment, since the piezoelectric elements 11a and 11b are fixed to the common base plate 12, an impact and vibration are transmitted to the piezoelectric elements 11a and 11b via the base plate 12 at the same timing, so that the signal components of the voltages V1a and V1b corresponding to that impact can be highly precisely synchronized with each other.

Figure 5A:
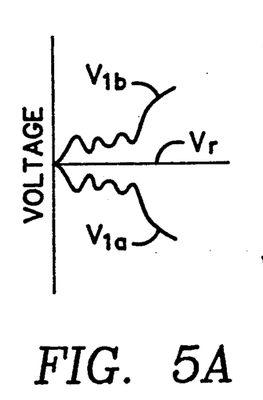
FIGS. 5A, 5B and 5C are illustrations respectively showing the outputs of the acceleration sensing circuits, the differential amplifier circuits and the integrating circuits at the time of a collision.

Since the piezoelectric elements 11a and 11b are mounted respectively on the front and rear surfaces of the base plate 12, one of these elements is subjected to a compressive force during the time when the other is subjected to a pulling force. Therefore, the signal components of the output voltage V1a and V1b are in opposite phase with each other with respect to the reference voltage Vr. More specifically, when the acceleration is zero, the output voltage V1a and V1b are both maintained at the reference voltage Vr. When a negative acceleration (i.e., deceleration) is produced by a collision or the like, one piezoelectric element 11a is subjected to a pulling force, so that its output voltage V1a goes below the reference voltage Vr whereas the other piezoelectric element is subjected to a compressive force, so that its output voltage V1b goes above the reference voltage Vr, as shown in FIG. 5A. Therefore, if the absolute value of the difference between these output voltages and the reference voltage (i.e., the absolute value of the signal components corresponding to the deceleration) is represented by $\Delta V1$, then the output voltages of the piezoelectric elements 11a and 11b at the time of the deceleration can be expressed by the following formulas, respectively:

$$V1a = -\Delta V1 + Vr \quad (1)$$

$$V1b = \Delta V1 + Vr \quad (2)$$

In the accelerating condition, in contrast with the above, the output voltage V1a goes above the reference voltage Vr, and the output voltage V1b goes below the reference voltage Vr. The output voltages V1a and V1b of the piezoelectric elements 11a and 11b are fed respectively to the differential amplifier circuits 20a and 20b via the respective buffers 14a and 14b.

Next, the differential amplifier circuits 20a and 20b will now be described. As shown in FIG. 2, the differential amplifier circuits 20a and 20b include respective operational amplifiers 21a and 21b which have respective negative feedback resistors R3a and R3b connected thereto. The output voltage V1a of one acceleration sensing circuit 10a is fed to an inverting input terminal of one operational amplifier 21a via a resistor R4a, and the output voltage V1b of the other acceleration sensing circuit 10b is fed to a non-inverting input terminal of the operational amplifier 21a via a resistor R5a. The operational amplifier 21b of the other differential amplifier 20b is connected to the acceleration sensing circuits 10a and 10b in a manner opposite to the above. Namely, the output voltage V1b of the acceleration sensing circuit 10b is fed to an inverting input terminal of the operational amplifier 21b via a resistor R4b, and the output voltage V1a of the acceleration sensing circuit 10a is fed to a non-inverting input terminal of the operational amplifier 21b via a resistor R5b.

A reference voltage source Vr and an offset voltage source Vo, connected together in the reverse direction, is connected to the non-inverting input terminal of the operational amplifier 21a of the differential amplifier 20a via a resistor R6a so that this non-inverting input terminal can be supplied with voltage (Vr−Vo). The reference voltage source Vr and the offset voltage source Vo, connected together in the normal direction, is connected to the non-inverting input terminal of the operational amplifier 21b via a resistor R6b so that this non-inverting input terminal can be supplied with voltage (Vr+Vo). The purpose of the offset voltage Vo will be described later. Here, the following relation is established:

$$R4a = R4b = R5a = R5b \quad (3)$$

$$R3a = R3b = R6a = R6b \quad (4)$$

The differential amplifier circuits 20a and 20b amplifies the output voltages V1a and V1b of the acceleration sensing circuits 10a and 10b in a differential manner, and their output voltages V2a and V2b are represented in the following:

$$V2a = (-V1a + V1b) \cdot (R3a/R4a) + Vr - Vo \quad (5)$$

$$V2b = (V1a - V1b) \cdot (R3b/R4b) + Vr + Vo \quad (6)$$

The above formulas (5) and (6) can be changed into simpler formulas as follows:

$$V2a = (-V1a + V1b) \cdot A + Vr - Vo \quad (7)$$

$$V2b = (V1a - V1b) \cdot A + Vr + Vo \quad (8)$$

where there is defined $A = (R3a/R4a) = (R3b/R4b)$.

When the acceleration is zero, the output voltages V1a and V1b are equal (i.e., Vr) to each other, and therefore the above formulas can be rewritten as follows:

$$V2a = Vr - Vo \quad (9)$$

$$V2b = Vr + Vo \quad (10)$$

The output voltages V2a and V2b at the time of the deceleration due to a collision or the like can be expressed by introducing the formulas (1) and (2) into the formulas (7) and (8) as follows:

$$V2a = 2A \cdot \Delta V1 + Vr - Vo \quad (11)$$

$$V2b = -2A \cdot \Delta V1 + Vr + Vo \quad (12)$$

Figure 5B:
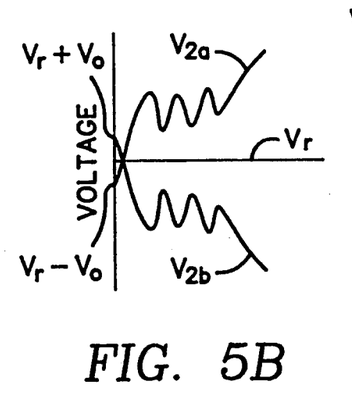

As is clear from the above formulas (11) and (12), the output voltages V2a and V2b corresponding to the deceleration are in opposite phase with each other with respect to the reference voltage Vr, and the difference between the output voltage V2a and the reference voltage Vr and the difference between the output voltage V2b and the reference voltage Vr is equal to each other in absolute value, and this absolute value is represented by $|2A \cdot \Delta V1 - Vo|$. At the time of the deceleration due to a collision or the like, the output voltage V2a of the differential amplifier circuit 20a becomes higher than the reference voltage Vr whereas the output voltage V2b of the differential amplifier circuit 20b becomes lower than the reference voltage Vr, as shown in FIG. 5B. At the time of the acceleration, the reverse is the case.

Next, the integrating circuits 30a and 30b will now be described. As shown in FIG. 2, the integrating circuits 30a and 30b have respective operational amplifiers 31a and 31b. The operational amplifiers 31a and 31b have respective capacitors 32a and 32b connected thereto in a negative feedback manner. The output voltages V2a and V2b of the differential amplifier circuits 20a and 20b are fed respectively to inverting input terminals of the operational amplifiers 31a and 31b via respective resistors R10a and R10b. The reference voltage Vr is supplied to non-inverting input terminals of the operational amplifiers 31a and 31b from the above-mentioned reference voltage source.

When the acceleration occurs or when the deceleration is smaller than the deceleration corresponding to the offset voltage Vo, the voltage V2a inputted to the inverting input terminal of one integrating circuit 30a is lower than the reference voltage Vr inputted to the non-inverting input terminal thereof, so that the output voltage V3a of the integrating circuit 30a increases to the constant voltage Vcc. A circuit for limiting the output voltage V3a to the constant voltage Vcc is omitted here. At this time, the voltage V2b inputted to the inverting input terminal of the other integrating circuit 30b is higher than the reference voltage Vr inputted to the non-inverting input terminal thereof, so that the output voltage V3b of the integrating circuit 30b decreases to a very small voltage close to zero volt. Here, a circuit for limiting the output voltage V3b to this very small voltage is omitted.

Figure 5C:
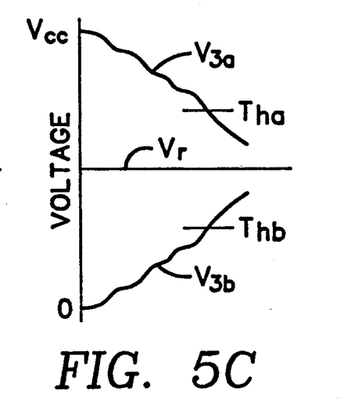

When the deceleration is larger than the deceleration corresponding to the offset voltage Vo as at the time of a collision, the integrating circuits 30a and 30b effect the integrating operation. Namely, since the input voltage V2a is higher than the reference voltage Vr, the output voltage V3a of one integrating circuit 30a decreases from the constant voltage Vcc as shown in FIG. 5C. Also, since the input voltage V2b is lower than the reference voltage Vr, the output voltage V3b of the other integrating circuit 30b increases from the very small voltage close to zero volt. As is clear from FIG. 5C, the output voltages V3a and V3b of the integrating circuits 30a and 30b are in opposite phase with each other with respect to the reference voltage Vr.

Next, the collision judgment circuits 40a and 40b will now be described. The collision judgment circuits 40a and 40b have respective comparators 41a and 41b. The output voltage V3a of the integrating circuit 30a is inputted to an inverting input terminal of one comparator 41a. The output voltage V3b of the integrating circuit 30b is inputted to a non-inverting input terminal of the other comparator 41b.

The collision judgment circuits 40a and 40b have a common threshold voltage generating circuit 43. The threshold voltage generating circuit 43 is composed of serially-connected three resistors R11, R12 and R13, and one terminal of this circuit 43 is connected to the constant voltage source Vcc whereas the other terminal thereof is grounded. Two voltages, obtained by dividing the constant voltage Vcc by the three resistors R11, R12 and R13, are inputted as threshold voltages Tha and Thb to a non-inverting input terminal of the comparator 41a and an inverting input terminal of the comparator 41b, respectively. As shown in FIG. 5C, the threshold voltages Tha and Thb differ the same amount in opposite directions from the reference voltage Vr. The threshold voltage Tha supplied to one comparator 41a is higher than the reference voltage Vr, and the threshold voltage Thb supplied to the other comparator 41b is lower than the reference voltage Vr.

The operation of the collision judgment circuits 40a and 40b will now be described. As described above, when the acceleration occurs or when the deceleration is small, one integral output V3a is at the constant voltage Vcc and is above the threshold voltage Tha whereas the other integral output V3b is zero volt and is below the threshold voltage Thb. Therefore, the output levels of the comparators 41a and 41b are both low.

At the time of a collision, the integral output V3a decreases below the threshold level Tha whereas the integral output V3b increases above the threshold level Thb. Therefore, the comparators 41a and 41b output respective collision judgment signal of a high level.

Figure 4:
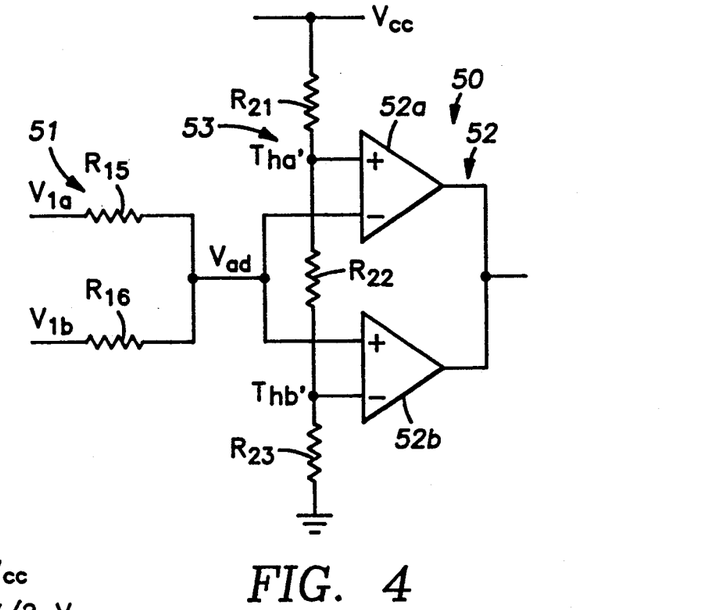
FIG. 4 is a detailed circuit diagram of a first malfunction judgment circuit of the control system.

Next, the first malfunction judgment circuit 50 will now be described in detail with reference to FIG. 4. The first malfunction judgment circuit 50 comprises an adder circuit 51, a window comparator 52 consisting of two comparators 52a and 52b, a threshold voltage generating circuit 53.

The adder circuit 51 comprises two resistors R15 and R16 having the same value or resistivity. One terminals of the resistors R15 and R16 are connected respectively to the output terminals of the buffers 11a and 11b of the acceleration sensing circuits 10 and 10b. The other terminals of the resistors R15 and R16 are connected together. Therefore, the voltage at the junction point between the two resistors R15 and R16 is a voltage Vad which is the sum of the output voltages V1a and V1b of the acceleration sensing circuits 10a and 10b, as expressed by the following formula:

$$Vad = (V1a + V1b)/2 \tag{13}$$

This adder voltage Vad is supplied to an inverting input terminal of the comparator 52a and a non-inverting input terminal of the comparator 52b.

Figure 6:
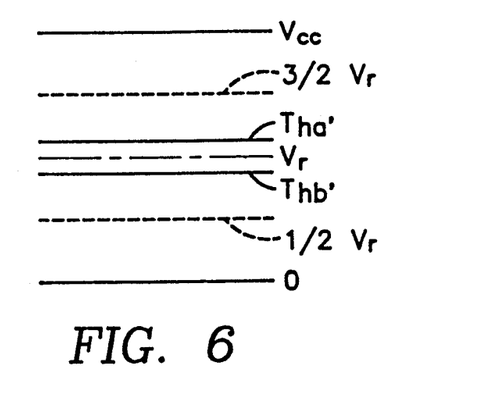
FIG. 6 is an illustration showing the comparison of threshold voltage levels of the first malfunction judgment circuit with other voltage levels.

The threshold voltage generating circuit 53 consists of three resistors R21, R22 and R23 connected in series with one another. One terminal of this circuit 53 is connected to the constant voltage source Vcc whereas the other terminal thereof is grounded. Two voltages, obtained by dividing the constant voltage Vcc by the resistors R21, R22 and R23, are supplied as threshold voltages Tha' and Thb' to a non-inverting input terminal of the comparator 52a and an inverting input terminal of the comparator 52b. As shown in FIG. 6, the threshold voltages Tha' and Thb' differ the same amount from the reference voltage Vr in opposite directions. On threshold voltage Tha' is higher than the reference voltage Vr and is lower than 3Vr/2, and the other threshold voltage Thb' is lower than the reference voltage Vr and is higher than Vr/2.

The first malfunction judgment circuit 50 judges whether or not the acceleration sensing circuits 10a and 10b is subjected to a malfunction. More specifically, if the acceleration sensing circuits 10a and 10b are normal, the signal components of the output voltages V1a and V1b which correspond to the acceleration/deceleration cancel each other, so that the adder voltage Vad is maintained at the reference voltage Vr. This will be appreciated by introducing the above formulas (1) and (2) into the above formula (13). Therefore, in this case, the adder voltage Vad is between the two threshold voltages Tha' and Thb', and the output of the window comparator 52 is at the high level.

Reference is now made to the case where the acceleration sensing circuits 10a and 10b are subjected to a malfunction due to a wire cutting or a short-circuiting, so that their output reaches zero volt or the constant voltage Vcc. First, let's consider the case where one of the acceleration sensing circuits 10a and 10b is subjected to a malfunction, so that it outputs the constant voltage Vcc (Vcc=2Vr). When the acceleration is zero, the output voltage of the other normal acceleration sensing circuit is Vr, and therefore the adder voltage Vad is 3Vr/2 and hence exceeds the threshold voltage Tha'. As a result, the output of the window comparator 52 is rendered to the low level (malfunction judgment signal). Incidentally, in order that the adder voltage Vad can exceed the threshold voltage Tha' even when the other normal acceleration sensing circuit is outputting the signal component in accordance with the acceleration or the deceleration, the threshold voltage Tha' is set to a relatively low level sufficiently below 3Vr/2, as shown in FIG. 6. Next, reference is now made to the case where one of the acceleration sensing circuits 10a and 10b is subjected to a malfunction, so that its output is rendered to zero volt. When the acceleration is zero, the output of the other normal acceleration sensing circuit is Vr. Therefore, the adder voltage Vad is Vr/2 and hence is below the threshold voltage Thb'. As a result, the output of the window comparator 52 is rendered to the low level (malfunction judgment signal). Incidentally, in order that the adder voltage Vad can be blow the threshold voltage Thb' even when the other normal acceleration sensing circuit is outputting the signal component in accordance with the acceleration or the deceleration, the threshold voltage Thb' is set to a relatively high level sufficiently above Vr/2, as shown in FIG. 6.

The second malfunction judgment circuit 55 and the third malfunction judgment circuit 56 are similar in construction to the first malfunction judgment circuit 50, and therefore their detailed construction are not shown here, and detailed explanation thereof is not given here. Briefly, the second malfunction judgment circuit 55 adds the outputs of the differential amplifier circuits 20a and 20b, and compares this addition output with two threshold voltages, and outputs a malfunction judgment signal of a low level when the addition output is not in an allowable range of between these two threshold voltages. The third malfunction judgment circuit 56 adds the outputs of the integrating circuits 30a and 30b, and compares this addition output with two threshold voltages so as to judge a malfunction.

The malfunction judgment signal of the second malfunction judgment circuit 55 indicates that at least one of the acceleration sensing circuits 10a and 10b and the differential amplifier circuits 20a and 20b is subjected to a malfunction. The malfunction judgment signal of the third malfunction judgment circuit 56 indicates that at least one of the acceleration sensing circuits 10a and 10b, the differential amplifier circuits 20a and 20b and the integrating circuits 30a and 30b is subjected to a malfunction. Therefore, in order to detect only a malfunction of the acceleration sensing circuits 10a and 10b, only one of the malfunction judgment circuits 50, 55 and 56 may be provided.

Next, the activation inhibition circuit 60 will now be described with reference to FIG. 1. The activation inhibition circuit 60 includes NAND circuit 61, AND circuit 62 and negative logic OR circuit 63. The output stage of the collision judgment circuit 40a is connected to one input terminal of the NAND circuit 61, and the output stage of the collision judgment circuit 40b is connected to one input terminal of the AND circuit 62. The output stages of the malfunction judgment circuits 50, 55 and 56 are connected to three input terminals of the negative lock OR circuit 63, respectively. An output terminal of the negative logic OR circuit 63 is connected to the other input terminal of the NAND circuit 61 and the other input terminal of the AND circuit 62.

Next, the drive circuit 70 will now be described with reference to FIG. 1. The drive circuit 70 includes a first transistor 71 of the PNP type and a second transistor 72 of the NPN type serially connected together, the first and second transistors 71 and 72 being arranged in this order from a battery $V_B$ toward the ground. The squib 1 is connected between the two transistors 71 and 72. An energy reservoir (not shown), in the form of a capacitor of a large capacity, and a booster circuit (not shown) for increasing the voltage of the energy reservoir to a level higher than the voltage of the voltage source are connected between the first transistor 71 and the battery $V_B$, the energy reservoir and the booster circuit being arranged in this order toward the voltage source. The base of the first transistor 71 is connected to an output terminal of the NAND circuit 61, and the base of the second transistor 72 is connected to an output terminal of the AND circuit 62.

The operations of the activation inhibition circuit 60 and the drive circuit 70 will now be described. When the acceleration sensing circuits 10a and 10b, the differential amplifier circuits 20a and 20b and the integrating circuits 30a and 30b are normal, the low-level malfunction judgment signal is not outputted from any of the malfunction judgment circuits 50, 55 and 56, and the output of the negative logic OR circuit 63 is at the high level. Therefore, in this normal condition, when the collision judgment signals of the high level are outputted respectively from the collision judgment circuits 40a and 40b, the transistors 71 and 72 are turned on, and therefore electric current is supplied to the squib 1 from the energy reservoir, so that the squib 1 is ignited to thereby expand the air bag.

When one of the acceleration sensing circuits 10a and 10b is subjected to a malfunction to output zero volt or the constant voltage Vcc, the outputs of the differential amplifier circuits 20a and 20b abnormally increase or decrease. At this time, the integral outputs V3a and V3b may exceed the threshold voltages Tha and Thb, respectively, so that the collision judgment signals may be outputted respectively from the two collision judgment circuits 40a and 40b at the same time. In this case, however, the activation inhibition circuit 60 is operated. More specifically, as mentioned above, since the malfunction judgment signals of the low level are outputted respectively from the malfunction judgment circuits 50, 55 and 56, the low-level signal is outputted from the negative logic circuit 63, so that the NAND circuit 61 and the AND circuit 62 are closed. As a result, the transistors 71 and 72 are inhibited from being turned on, thereby positively preventing an inadvertent activation of the air bag.

When any one of the differential amplifier circuits 20a and 20b and the integral circuits 30a and 30b is subjected to a malfunction, the inadvertent activation of the air bag can be prevented in a similar manner mentioned above.

The control system further comprises an alarm lamp 80. One terminal of the alarm lamp 80 is connected to the output terminal of the negative logic OR circuit 63 via a buffer 81, and the other terminal thereof is connected to the battery $V_B$. When any one of the acceleration sensing circuits 10a and 10b, the differential amplifier circuits 20a and 20b and the integral circuits 30a and 30b is subjected to a malfunction, the output of the negative logic OR circuit 63 goes low, so that the alarm lamp 80 is turned on, thereby informing the passenger of the vehicle of the malfunction.

Next, noises will now be discussed. The differential amplifier circuits 20a and 20b serve to remove noises produced in the acceleration sensing circuits 10a and 10b. As described above, the noises are in phase with each other, and when the noises in phase with each other are added respectively to the output voltages V1a and V1b the acceleration sensing circuits 10a and 10b, the noises cancel each other at the differential amplifier circuits 20a and 20b, so that any noise component is not contained in each of the output voltages V2a and V2b of the differential amplifier circuits 20a and 20b. Therefore, the outputs of the integrating circuits 30a and 30b are maintained at the normal level. As a result, a collision judgment due to the above noises will not be made, thus preventing an inadvertent activation of the air bag.

Further, even if noises in phase with each other are produced respectively in either the differential amplifier circuits 20a and 20b or the integrating circuits 30a and 30b, the inadvertent activation of the air bag can be prevented. More specifically, for example, when noises causing the integral outputs V3a and V3b to drop are produced in either the differential amplifier circuits 20a and 20b or the integrating circuits 30a and 30b, there is a possibility that the integral value V3a may go below the threshold voltage Tha, so that the collision judgment signal may be outputted from one collision judgment circuit 40a. In this case, however, the other integral output V3b goes toward zero volt, and will not exceed the threshold voltage Thb. Therefore, the other collision judgment circuit 40b never outputs the collision judgment signal. Also, in the case of noises causing the integral outputs V3a and V3b to rise, in contrast with the above case, the collision judgment signal may be outputted from the collision judgment circuit 40b. In this case, however, the collision judgment signal is not outputted from the collision judgment circuit 40a. As a result, even in the worst case, only one of the two transistors 71 and 72 is turned on, so that the inadvertent activation of the air bag can be prevented.

Figure 7:
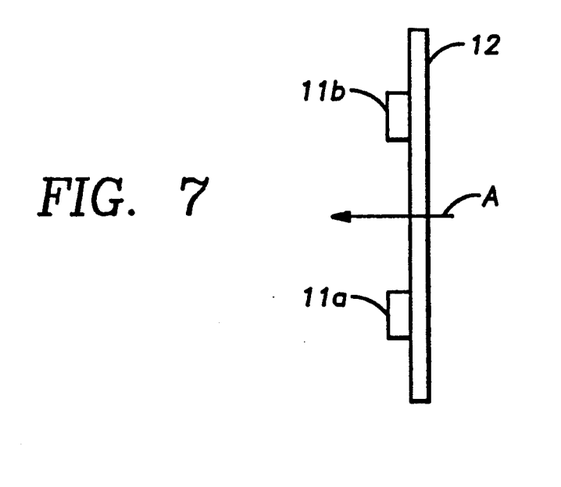
FIG. 7 is a view similar to FIG. 3, but showing a modified arrangement of the piezoelectric elements.
Figure 8:
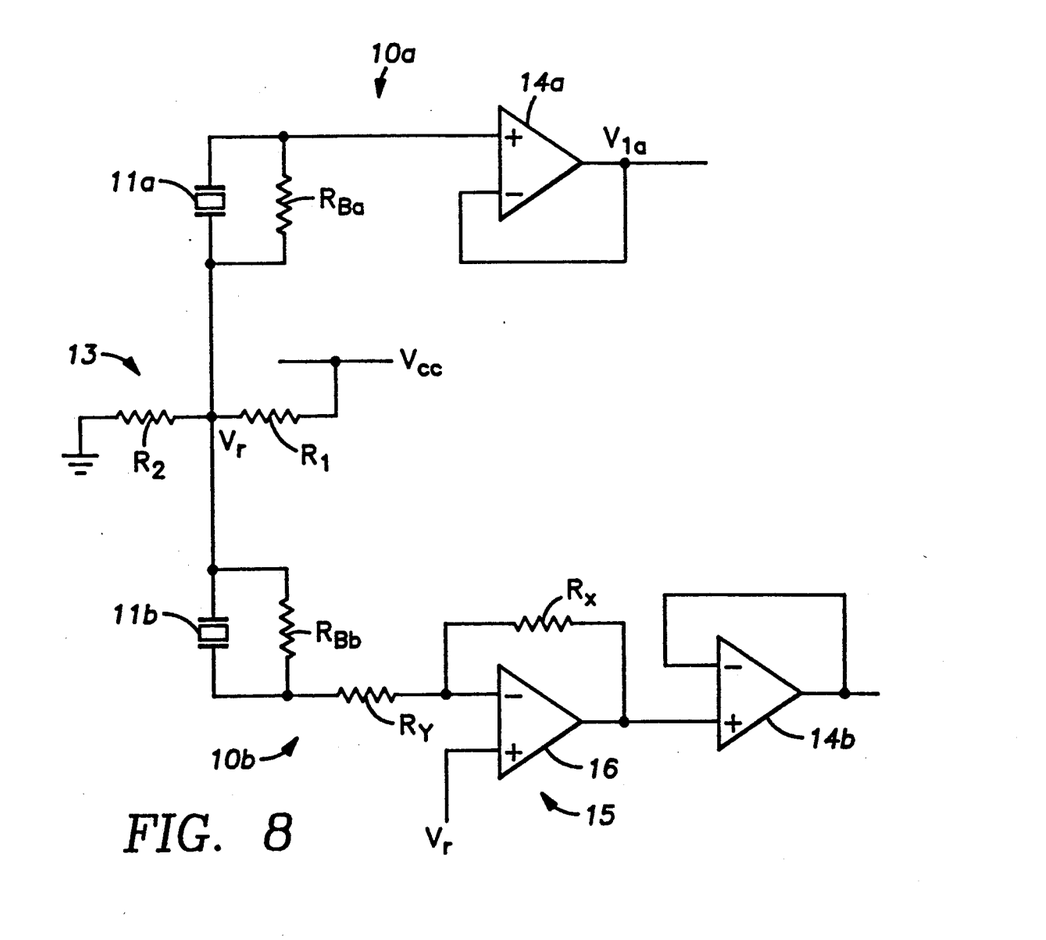
FIG. 8 is a detailed circuit diagram of acceleration sensing circuits employing the piezoelectric elements shown in FIG. 7.

As shown in FIG. 7, the piezoelectric elements 11a and 11b may be mounted on the same surface (e.g. the front surface) of the base plate 12. The piezoelectric elements 11a and 11b output signals in phase with each other. In this case, as shown in FIG. 8, one acceleration sensing circuit 10b has an inverting amplifier circuit 15 interposed between the piezoelectric element 11b and the buffer 14b. The inverting amplifier circuit 15, together with the piezoelectric element 11b, is sealed and insulated from noises. The inverting amplifier circuit 15 comprises an operational amplifier 16, a negative feedback resistor Rx, and an input resistor Ry. Since the negative feedback resistor Rx and the input resistor Ry have the same value or resistivity, the amplification degree (factor) of the inverting amplifier circuit 15 is "1". The output of the piezoelectric element 11b is inverted by the inverting amplifier circuit 15 into V1b which is in opposite phase with the output V1a of the acceleration sensing circuit 10a. Those parts of FIG. 8 corresponding respectively to those of FIG. 2 are designated by identical reference numerals, respectively, and detailed explanation thereof is omitted here.

Figure 9:
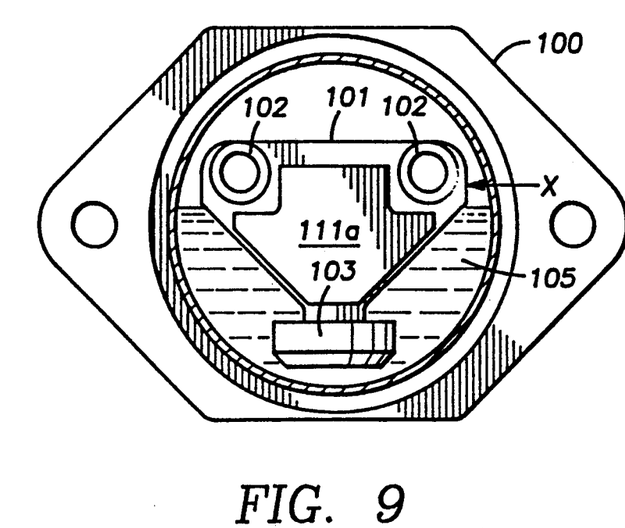
FIG. 9 is a front-elevational view of modified acceleration sensors.
Figure 10:
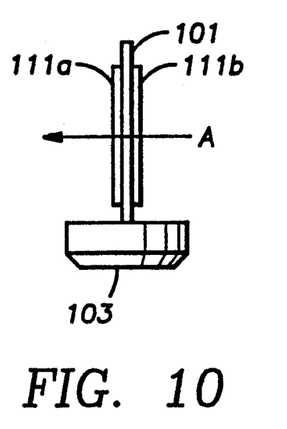
FIG. 10 is a side-elevational view as seen from the direction of arrow X of FIG. 9.

The acceleration sensors are not limited to the piezoelectric elements, and may comprises strain gauges 111a and 111b as shown in FIGS. 9 and 10. More specifically, a leaf spring (base member) 101 is received within a casing 100 fixedly mounted on the vehicle. The upper end of the leaf spring 101 is fixedly secured to the casing 100 by fixing members 102. A weight 103 is secured to the lower end of the leaf spring 101. The strain gauges 111a and 111b are bonded to the opposite surfaces of the leaf spring 101, respectively. A damper liquid 105 is held in the casing 100.

The leaf spring 101 and the strain gauges 111a and 111b are disposed perpendicularly to the direction A of running of the vehicle. When the vehicle is accelerated, the weight 103 is moved rearward due to an inertia force, so that the leaf spring 101 is resiliently deformed. At this time, one strain gauge 111a is expanded whereas the other strain gauge 111b is contracted. When the vehicle is decelerated, the weight 103 is moved forward, so that one strain gauge 111a is contracted whereas the other strain gauge 111b is expanded.

Figure 11:
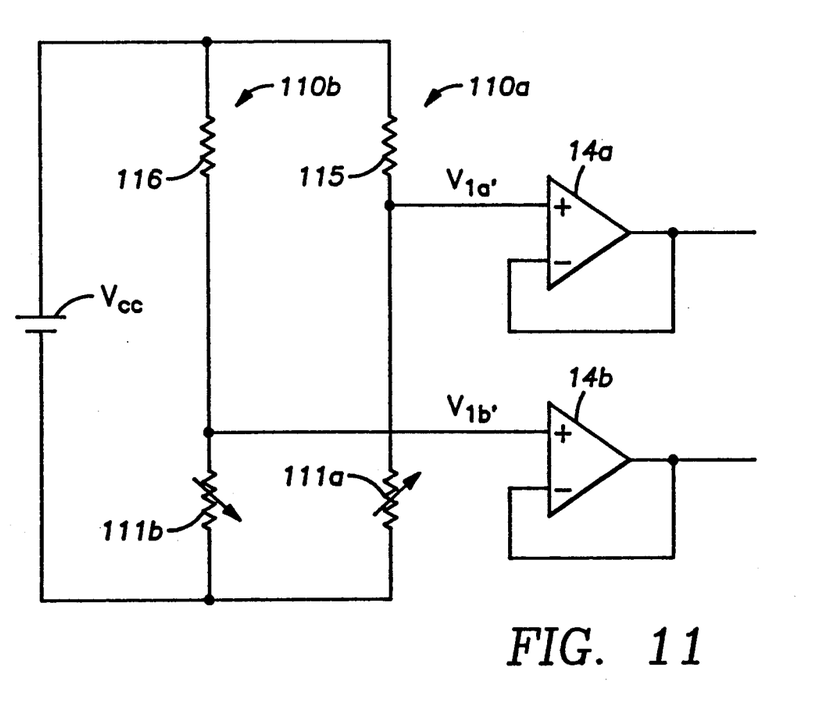
FIG. 11 is a detailed circuit diagram of acceleration sensing circuits employing the acceleration sensors of FIGS. 9 and 10.

FIG. 11 shows acceleration sensing circuits 110a and 110b having the strain gauges 111a and 111b, respectively. More specifically, the acceleration sensing circuit 110a comprises a resistor 115 and the strain gauge 111a connected in series therewith, and the acceleration sensing circuit 110b comprises a resistor 116 and the strain gauge 111b connected in series therewith. In this embodiment, the resistors 115 and 116 have the same value or resistivity. The acceleration sensing circuits 110a and 110b are connected to a common constant voltage source Vcc. A voltage at the junction point between the resistor 115 and the strain gauge 111a is represented by V1a', and a voltage at the junction point between the resistor 116 and the strain gauge 111b is represented by V1b'. When the acceleration is zero (that is, the leaf spring 101 is not deformed), the resistivities of the strain gauges 111a and 111b are equal to each other, and also equal to the resistivity of the resistors 115 and 116.

When the acceleration is zero, the output voltages V1a' and V1b' of the acceleration sensing circuits 110a and 110b are maintained at a reference voltage Vr (=Vcc/2). At the time of the deceleration, one strain gauge 111a is contracted and is decreased in resistivity, so that one output voltage V1a' becomes lower than the reference voltage Vr. At this time, the other strain gauge 111b is expanded and is increased in resistivity, so that the other output voltage V1b' becomes higher than the reference voltage Vr. The reverse is achieved at the time of the acceleration. In this manner, the voltages V1a' and V1b' in opposite phase with each other with respect to the reference voltage Vr are outputted.

Figure 12:
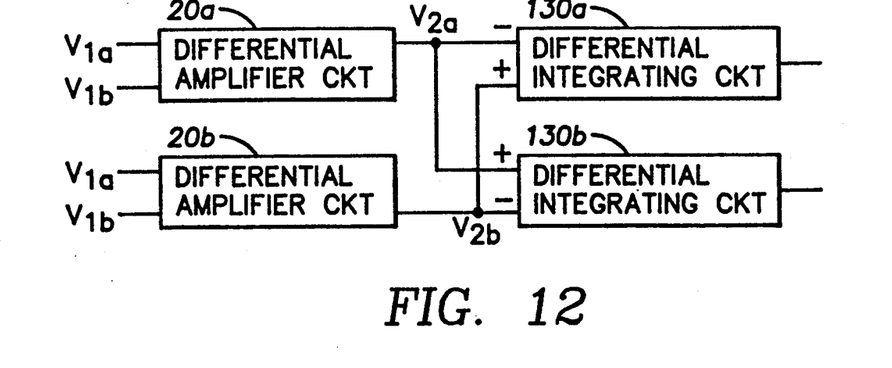
FIG. 12 shows a modified portion of the control system of FIG. 1 wherein integrating circuits 30a and 30b have been replaced with differential integrating circuits 130a and 130b.
Figure 13:
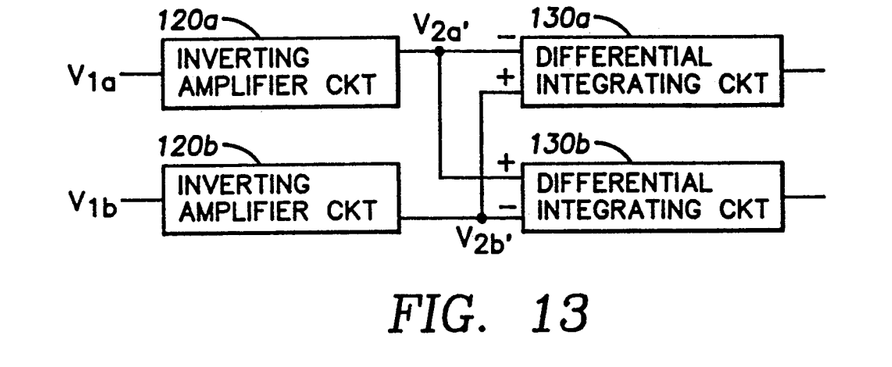
FIG. 13 shows the modified portion of FIG. 12 wherein differential amplifier circuits 20a and 20b have been replaced with inverting amplifiers 120a and 120b.
Figure 14:
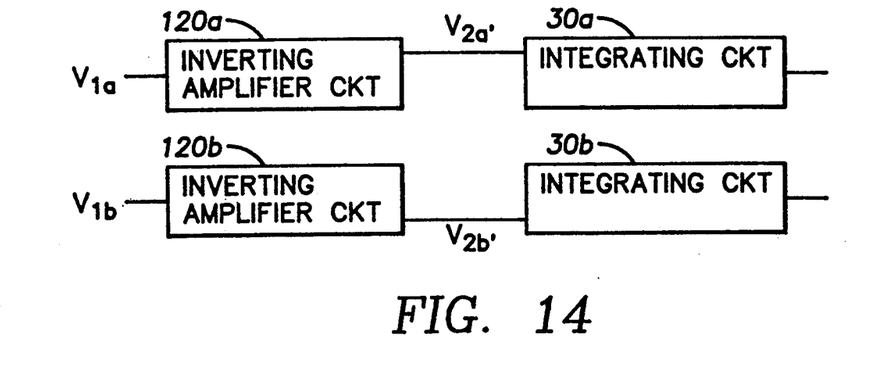
FIG. 14 shows a modified portion of the control system of FIG. 1 wherein differential amplifier circuits 20a and 20b have been replaced with inverting amplifier circuits 120a and 120b.

FIGS. 12 to 14 show modified control systems, respectively, and those parts of these Figures identical in construction to those of the embodiment of FIG. 1 are omitted.

In the control system shown in FIG. 12, instead of the integrating circuits 30a and 30b of FIG. 1, differential integrating circuits 130a and 130b are used. An output V2a of a differential amplifier circuit 20a is fed to an inverting input terminal of one differential integrating circuit 130a, and an output V2b of a differential amplifier circuit 20b is fed to a non-inverting input terminal of the differential integrating circuit 130a. The output V2b of the differential amplifier circuit 20b is fed to an inverting input terminal of the other differential integrating circuit 130b, and the output V2a of the differential amplifier circuit 20a is fed to a non-inverting input terminal of the differential integrating circuit 130b. Therefore, the outputs of the differential integrating circuits 130a and 130b are in opposite phase with each other. In this embodiment, in-phase noises produced in acceleration sensing circuits 10a and 10b cancel each other at the differential amplifier circuits 20a and 20b, and even if part of these noises remain in the outputs of the differential amplifier circuits 20a and 20b, they cancel each other at the differential integrating circuits 130a and 130b. Also, in-phase noises applied to the outputs of the differential amplifier circuits 20a and 20b cancel each other at the differential integrating circuits 130a and 130b.

In the control system shown in FIG. 13, instead of the differential amplifier circuits 20a and 20b of FIG. 1, inverting amplifier circuits 120a and 120b are used, and instead of the integrating circuits 30a and 30b, differential integrating circuits 130a and 130b (differential calculation means) are used. The condition of connection of input terminals of the differential integrating circuit 130a to the inverting amplifier circuits 120a and 120b is opposite to the condition of connection of input terminals of the differential integrating circuit 130b to the inverting amplifier circuits 120a and 120b. The outputs of the two differential integrating circuits 130a and 130b are in opposite phase with each other. In this embodiment, the differential integrating circuits 130a and 130b differential integrate outputs V2a' and V2b' of the inverting amplifier circuits 120a and 120b so as to remove noises applied to acceleration sensing circuits 10a and 10b or the inverting amplifier circuits 120a and 120b.

In the control system shown in FIG. 14, instead of the differential amplifier circuits 20a and 20b of FIG. 1, inverting amplifier circuits 120a and 120b are used. In this embodiment, noises applied to acceleration sensing circuits 10a and 10b are not removed, but are contained in the outputs of integrating circuits 30a and 30b. However, this noise is in phase with the output of one of the acceleration sensing circuits 10a and 10b, but is in opposite phase with the output of the other acceleration sensing circuit. Therefore, even in the worst case, only one of collision judgment circuits 40a and 40b (FIG. 1) decides the collision, and therefore the inadvertent activation of the air bag is prevented.

The present invention is not restricted to the above embodiments, and various modifications can be made. For example, the differential calculation, the integrating calculation, the collision judgment and the malfunction judgment may be carried out by a microcomputer.

The control system of the present invention can be applied not only to the air bag but also to a seat belt-tightening device.

What is claimed is:

1. A control system for a vehicle safety device comprising:
   (a) first and second acceleration sensing circuits each having an acceleration sensor; outputs of said acceleration sensing circuits corresponding to a deceleration of a vehicle in a direction of running of the vehicle, and being in opposite phase with each other;
   (b) first and second differential amplifier circuits, the outputs of said first and second acceleration sensing circuits being fed respectively to a non-inverting input terminal and an inverting input terminal of said first differential amplifier circuit, and the outputs of said first and second acceleration sensing circuits being fed respectively to an inverting input terminal and a non-inverting input terminal of said second differential amplifier circuit, whereby the outputs of said first and second differential amplifier circuits are in opposite phase with each other;
   (c) a pair of integrating circuits respectively receiving and integrating the outputs of said first and second differential amplifier circuits, whereby the integral outputs of said pair of integrating circuits are in opposite phase with each other;
   (d) a pair of collision judgment circuits, each of which compares the output of a corresponding one of said integrating circuits with a threshold level, and outputting a collision judgment signal when said output of said corresponding one of said integrating circuits exceeds said threshold level; and
   (e) a drive circuit activating the vehicle safety device when receiving said the collision judgment signals from said pair of collision judgment circuits at the same time.

2. A control system for a vehicle safety device comprising:
   (a) first and second acceleration sensing circuits each having an acceleration sensor, outputs of said acceleration sensing circuits corresponding to a deceleration of a vehicle in a direction of running of the vehicle, and being in opposite phase with each other;
   (b) first and second differential amplifier circuits, the outputs of said first and second acceleration sensing circuits being fed respectively to a non-inverting input terminal and an inverting input terminal of said first differential amplifier circuit, and the outputs of said first and second acceleration sensing circuits being fed respectively to an inverting input terminal and a non-inverting input terminal of said second differential amplifier circuit, whereby the outputs of said first and second differential amplifier circuits are in opposite phase with each other;
   (c) first and second differential integrating circuits, the outputs of said first and second differential amplifier circuits being fed respectively to a non-inverting input terminal and an inverting input terminal of said first differential integrating circuit, the outputs of said first and second differential amplifier circuits being fed respectively to an inverting input terminal and a non-inverting input terminal of said second differential integrating circuit, whereby the outputs of said first and second differential integrating circuits are in opposite phase with each other;
   (d) a pair of collision judgment circuits, each of which compares the output of a corresponding one of said differential integrating circuits with a threshold level, and outputting a collision judgment signal when said output of said corresponding one of said differential integrating circuits exceeds said threshold level; and
   (e) a drive circuit activating the vehicle safety device when receiving the said collision judgment signals from said pair of collision judgment circuits at the same time.

3. A control system for a vehicle safety device comprising:
   (a) a first and second acceleration sensing circuits each having an acceleration sensor, outputs of said acceleration sensing circuits corresponding to a deceleration of a vehicle in a direction of running of the vehicle, and being in opposite phase with each other;
   (b) first and second amplifier circuits respectively receiving and amplifying the outputs of said first and second acceleration sensing circuits, whereby the outputs of said first and second amplifier circuits are in opposite phase with each other;
   (c) first and second differential integrating circuits, the outputs of said first and second amplifier circuits being fed respectively to a non-inverting input terminal and an inverting input terminal of said first differential integrating circuit, the outputs of said first and second amplifier circuits being fed respectively to an inverting input terminal and a non-inverting input terminal of said second differential integrating circuit, whereby the outputs of said first and second differential integrating circuits are in opposite phase with each other;
   (d) a pair of collision judgment circuits, each of which compares the output of a corresponding one of said differential integrating circuits with a threshold level, and outputting a collision judgment signal when said output of said corresponding one of said differential integrating circuits exceeds said threshold level; and
   (e) a drive circuit activating the vehicle safety device when receiving said the collision judgment signals from said pair of collision judgment circuits at the same time.

4. A control system according to one of claim 1 through claim 3, in which there is provided malfunction judgment means for adding the outputs of said pair of acceleration sensing circuits, and for comparing this added value with two different threshold levels, and for judging that a malfunction has occurred in one of said pair of acceleration sensing circuits when said added value is outside of the range between said two threshold levels.

5. A control system according to claim 4, in which there is provided activation inhibition means responsive to the malfunction judgment by said malfunction judgment means so as to inhibit the activation of the vehicle safety device.

6. A control system according to one of claim 1 through claim 3, in which said pair of acceleration sensors are mounted on a common base member mounted on the vehicle.

7. A control system according to claim 6, in which said base member comprises a rigid plate whose plane is disposed perpendicular to the direction of running of the vehicle, said pair of acceleration sensors comprising piezoelectric elements, respectively, which are mounted on front and rear surfaces of rigid plate, respectively.

8. A control system according to claim 6, in which said base member comprises a leaf spring whose plane is disposed perpendicular to the direction of running of the vehicle, said pair of acceleration sensors comprising strain gauges, respectively, which are mounted on front and rear surfaces of leaf spring, respectively.

* * * * *